United States Patent

Nelson, Jr.

[15] 3,641,327

[45] Feb. 8, 1972

[54] UNAMBIGUOUS DIGITAL PROCESSING OF DUAL BINARY THREE-VALUED CODES

[72] Inventor: Carl W. Nelson, Jr., 2606 N. Brandywine St., Arlington, Va. 22207

[22] Filed: Aug. 13, 1969

[21] Appl. No.: 849,820

[52] U.S. Cl. ....................................235/155, 178/68

[51] Int. Cl. ....................................G06f 5/02

[58] Field of Search ....................178/68; 179/15, 15 BC; 325/38 A; 235/155

[56] References Cited

UNITED STATES PATENTS

| | | | |
|---|---|---|---|
| RE26,930 | 7/1970 | Brogle, Jr. | 178/68 |
| 3,303,284 | 2/1967 | Lender | 178/68 |
| 3,162,724 | 12/1964 | Ringelhaan | 178/68 |

*Primary Examiner*—Malcolm A. Morrison
*Assistant Examiner*—David H. Malzahn
*Attorney*—Francis D. Stephens and Hugo Huettig, Jr.

[57] ABSTRACT

This invention contemplates means for digital resolution of three-valued code ambiguities resulting from the combination in parallel of two signed binary sequences (O=−, 1=+, or vice versa) offset from one another by one-half code element, their combination relating elements of the second to adjacent elements of the first and resulting in three-valued code elements+, 0 or −, the first three-valued code sequence element being ambiguous due to the signed binary sequences' offset, said first element three-valued ambiguity being resolved by combining the signed value of the final element in the second signed binary sequence with the signed value of the first element in the first binary sequence; and, the last three-valued code sequence also being ambiguous due to the signed binary sequences' offset, said last element three-valued ambiguity being resolved by repeating the signed value of the final element in the second signed binary sequence as an appended final signed value in the resulting three-valued sequence, said appended final three-valued sequence element being called the LINK; the inherent nonredundant error detection feature of this class of three-valued codes being preserved; the LINK providing information and means for unambiguous decoding of the said three-valued sequence, zero value elements of which are ambiguous and all-zero value three-valued sequences being totally ambiguous in decode to the two component signed binary sequences, the said decode ambiguities being resolved by circuit means to place the signed value of the three-valued LINK element into the last element of the second signed binary sequence, in turn the last element of the second signed binary sequence being combined with the next to the last three-valued sequence thus defining the signed value of the last element in the first signed binary sequence, circuit operations being carried on sequentially to finally produce the first elements of the signed binary sequences and a FLAG signal element useful in clocking the signed bnary binary into their related circuit registers.

4 Claims, 14 Drawing Figures

| BINARY | SIGNED BINARY |
|---|---|
| 1 | + + |
| 0 | – – |
Fig. 1
TABLE OF RELATIONS
| A | B | C |
|---|---|---|
| + | + | + |
| + | – | 0 |
| – | + | 0 |
| – | – | – |
Fig. 2
| | | | | | | | | | 1 | 1 | 1 | 1 | 1 | 1 | 1 | 1 |
|---|---|---|---|---|---|---|---|---|---|---|---|---|---|---|---|---|
| | 1 | 2 | 3 | 4 | 5 | 6 | 7 | 8 | 9 | 0 | 1 | 2 | 3 | 4 | 5 | 6 | 7 |
| A | – | – | + | + | – | – | – | – | + | + | + | + | – | – | + | + | |
| B | | – | – | + | + | + | + | – | – | + | + | – | – | + | + | – | – |
| C | ? | – | 0 | + | 0 | 0 | 0 | – | 0 | + | + | 0 | – | 0 | + | 0 | ? |
Fig. 3
| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| A | + | + | + | + | + | + | + | + | + | + | + | + | + | + | + | + | |
| B | | – | – | – | – | – | – | – | – | – | – | – | – | – | – | – | – |
| C | ? | 0 | 0 | 0 | 0 | 0 | 0 | 0 | 0 | 0 | 0 | 0 | 0 | 0 | 0 | 0 | ? |
| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| A | – | – | – | – | – | – | – | – | – | – | – | – | – | – | – | – | |
| B | | + | + | + | + | + | + | + | + | + | + | + | + | + | + | + | + |
| C | ? | 0 | 0 | 0 | 0 | 0 | 0 | 0 | 0 | 0 | 0 | 0 | 0 | 0 | 0 | 0 | ? |
Fig. 4
Fig. 5
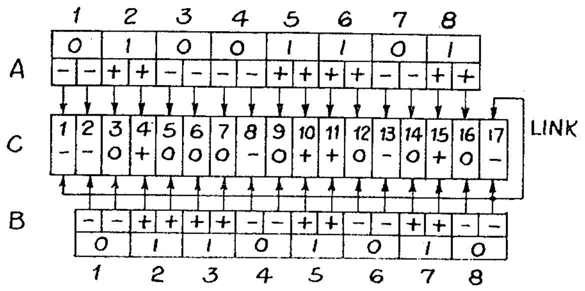
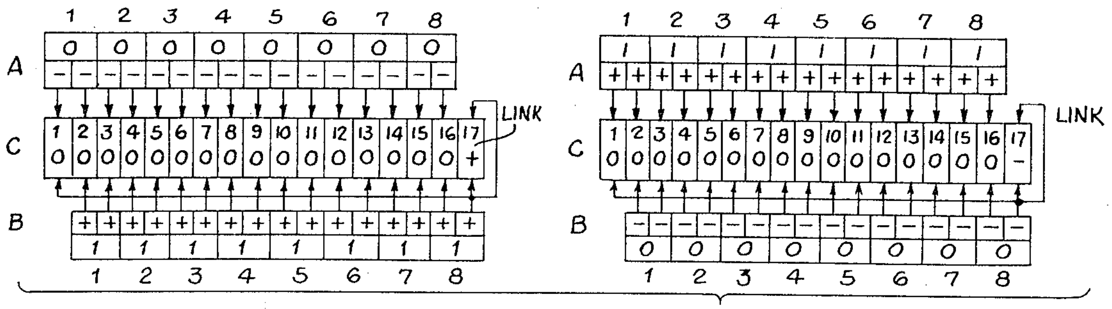
Fig. 6
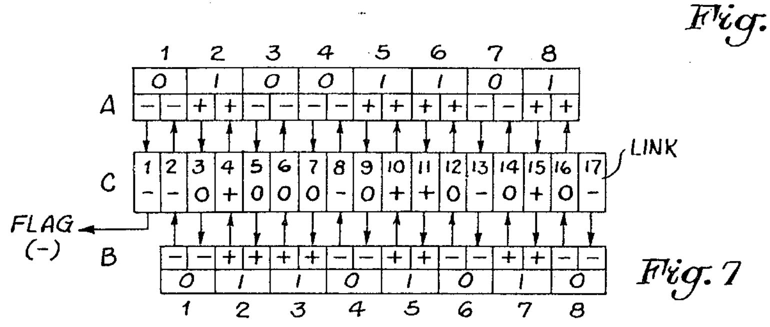
Fig. 7
INVENTOR
Carl W. Nelson, Jr.

INVENTOR

Carl W. Nelson, Jr.

INVENTOR

Carl W. Nelson, Jr.

INVENTOR
Carl W. Nelson, Jr.

INVENTOR
Carl W. Nelson, Jr.

INVENTOR

Carl W. Nelson, Jr.

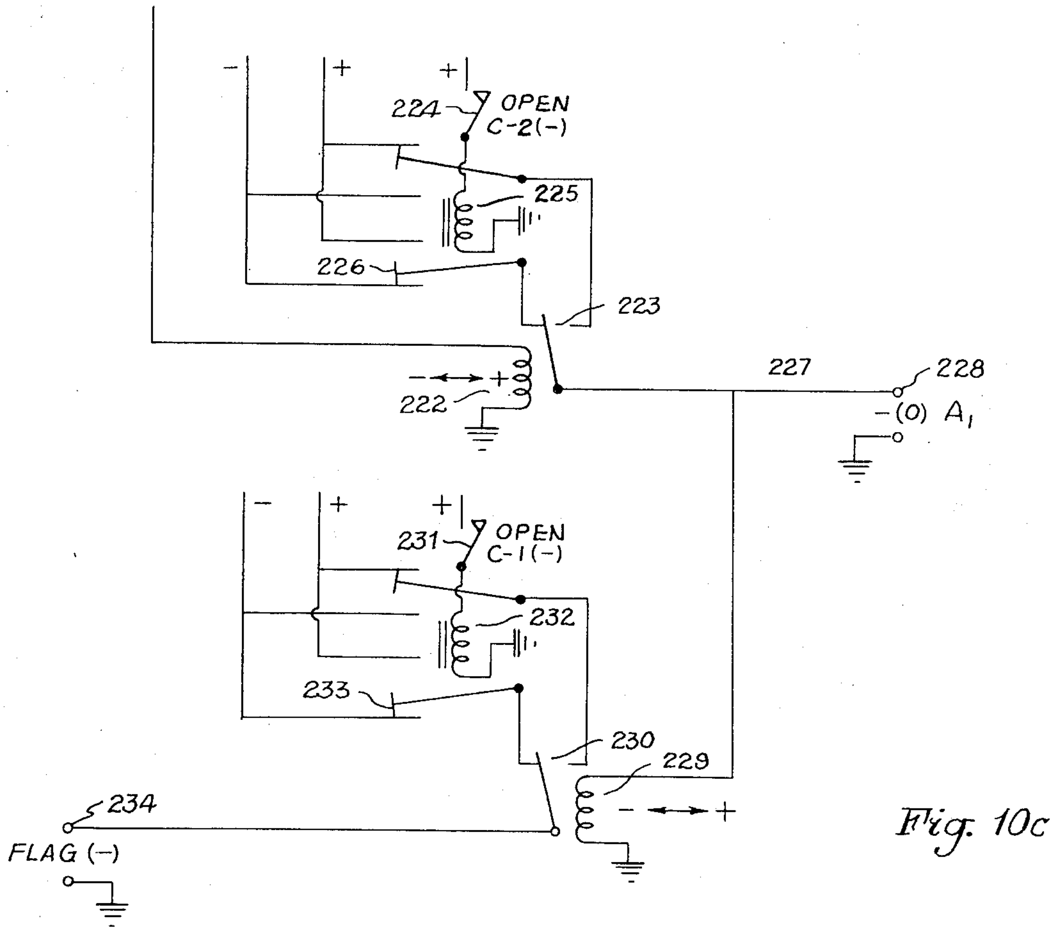
Fig. 10c
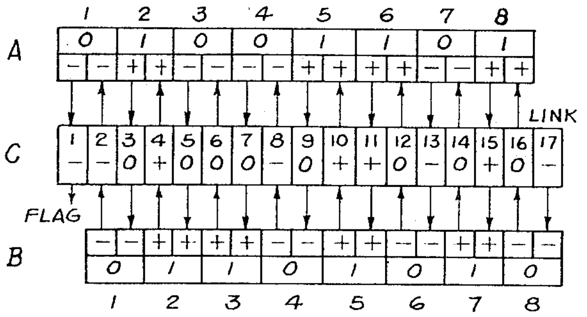
TABLE OF RELATIONS
| A | B | C |
|---|---|---|
| + | + | + |
| + | − | 0 |
| − | + | 0 |
| − | − | − |
INVENTOR
Carl W. Nelson, Jr.

UNAMBIGUOUS DIGITAL PROCESSING OF DUAL BINARY THREE-VALUED CODES

This invention relates to computing, recording, communication, and radar digital coding methods and apparatus; and more particularly to methods, techniques, and apparatus for unambiguous digital processing in the encoding and the decoding of information in dual binary three-valued code. A dual binary three-valued code is defined by the code elements +, 0, or − resulting from one-half code interval offset arithmetic addition of signed binary sequences, the objective being unambiguous encoding and decoding of two different or of two identical two-valued code information sequences having identical parameters into and out of a single three-valued code sequence.

With exception of Winder (U.S. Pat. No. 3,308,285), references in this field treat three-valued coding of binary values and the resolution of their ambiguities as some function of the signal modulation and demodulation process in which the ambiguities of the three-valued coding are resolved and interrelated with signal transmission, reception, or related control techniques.

A principal ambiguity in dual binary three-valued coding (the case of all 0's in one binary sequence and all 1's in the other binary sequence and vice versa) is not resolved directly by any of these authors. Lender (U.S. Pat. No. 3,303,284) resolves the binary sequence ambiguity by clocking and thus identifying the bits of a selected binary sequence. Brogle (U.S. Pat. No. 3,230,310) avoids the problem by suppressing all 0 and all 1 binary sequences, thus complicating usage of these codes for certain purposes.

Means for digital resolution of three-valued code ambiguities separate and apart from transmission, reception and control techniques materially expand the applicability, flexibility, and usefulness of dual binary three-valued codes. This is an objective of this invention. As is the case for duobinary, biternary and other three-level signaling systems cited above, it is inherent that the dual binary three-valued code disclosed herein will permit information handling at twice the binary rate, or, said another way, in one-half the bandwidth required for binary system handling of the same information.

Features of the invention and a selected embodiment are described, the illustrations for which include:

FIG. 1 is a table of relations for binary and signed binary code elements.

FIG. 2 is a table of arithmetic relations for two signed binary one-half code elements and their sum represented by three-valued code elements.

FIG. 3 displays arithmetic addition of one-half element signed binary values based on selected characters of the ASCII seven-unit code with an even parity bit, the addend being offset one-half signed binary code element from the augend, and illustrates the ambiguities of the resultant three-valued code.

FIG. 4 displays one-half interval offset arithmetic addition of binary signed values, all 1's in the augend sequence A, all 0's in the addend sequence B and vice versa, and illustrates the ambiguities in the resulting three-valued code.

FIG. 5 illustrates encode features of the invention.

FIG. 6 illustrates augend all 0's and addend all 1's arithmetic addition and vice versa, and the three-valued code elements and LINK value resulting.

FIG. 7 illustrates decode features of the invention.

Figure 8:
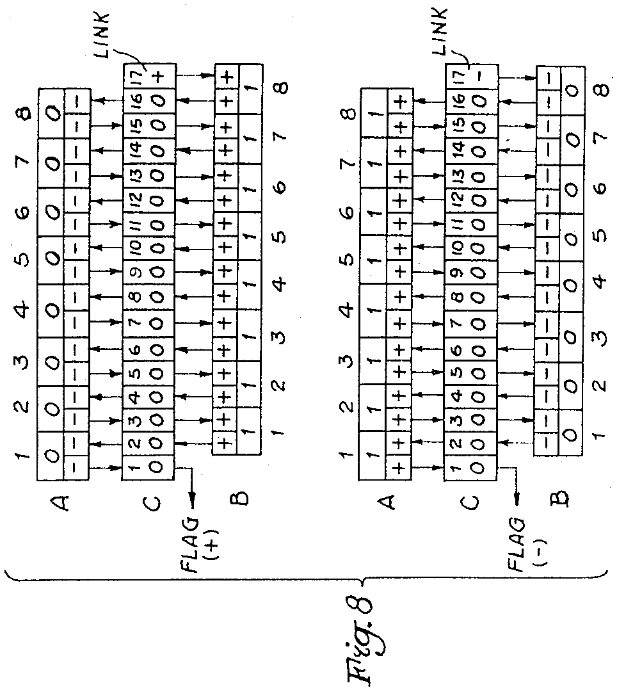

FIG. 8 illustrates use of the LINK value for resolution of the decode ambiguity resulting from all 0's in a three-valued code sequence.

Figure 9A:
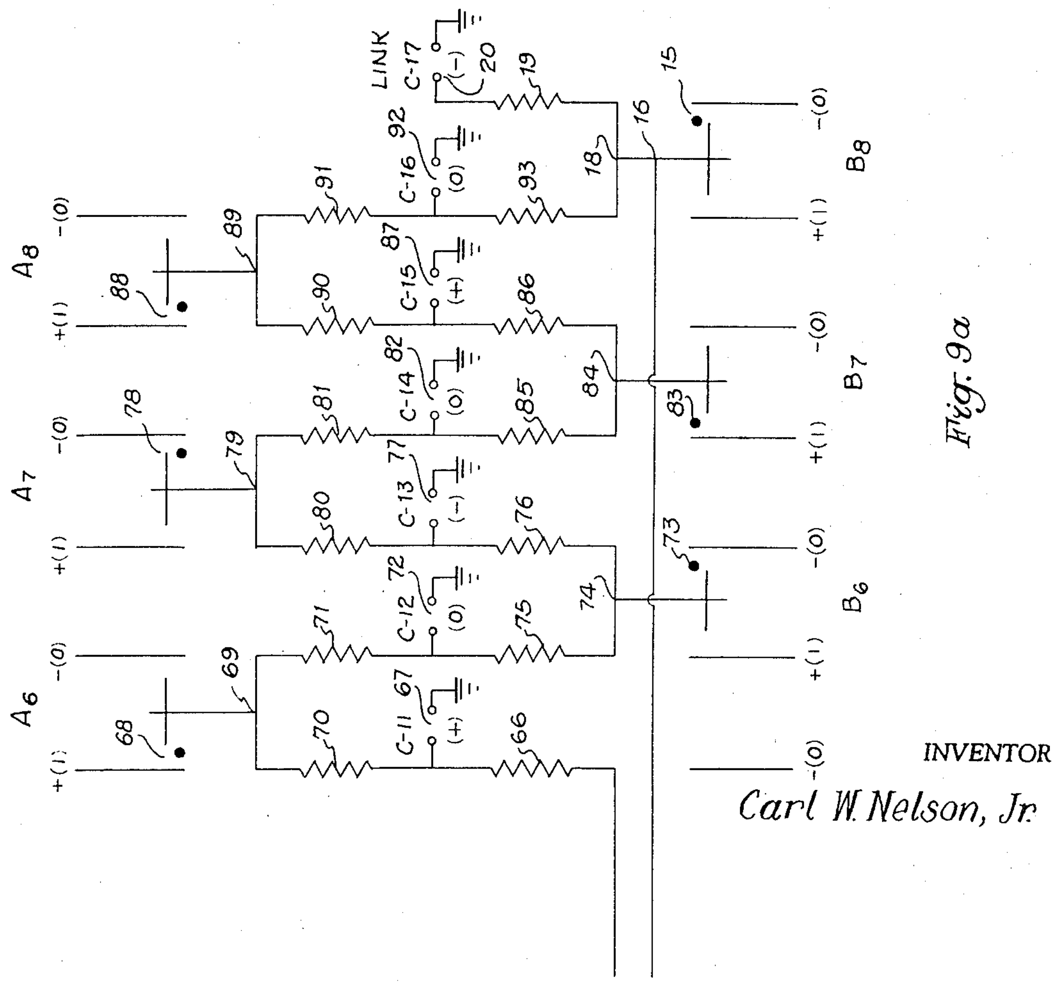
Figure 9:
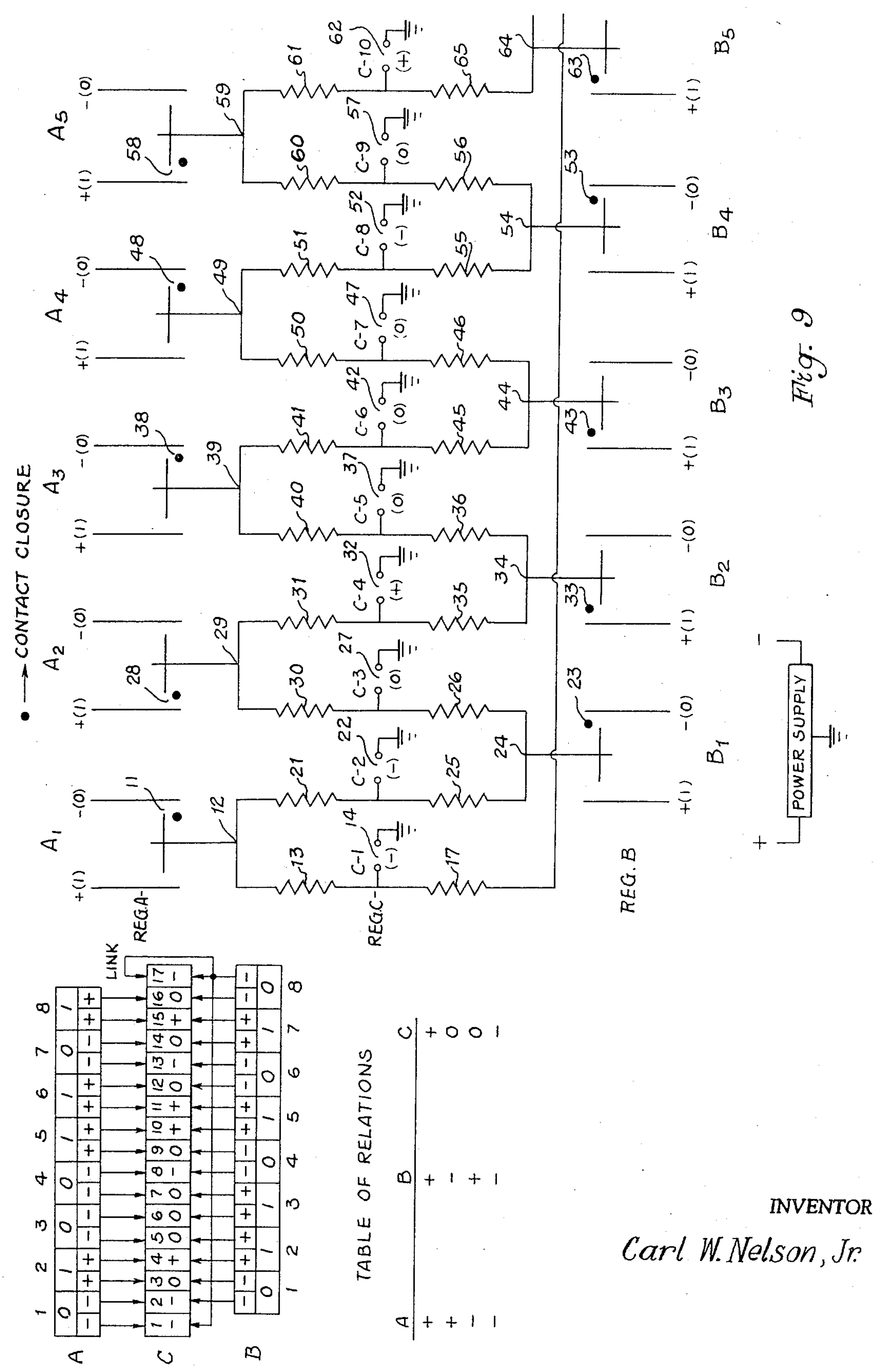

FIG. 9, and 9*a* illustrates the encode circuitry for a selected embodiment of the invention.

FIG. 10, 10*a*, 10*b*, and 10*c* illustrate the decode circuitry for a selected embodiment of the invention.

The choice of sign representing binary values in FIG. 1 is arbitrary, i.e., either ++ or −− may represent binary 1 and correspondingly for binary 0. This discussion will follow the relations shown. The signed elements represent the two one-half signed elements of a binary value.

Column C of FIG. 2 shows one ambiguity of a three-valued code element 0 which may represent either + and − or − and + in columns A and B respectively. From this table of relations it is clear that both encode and decode of this three-valued code are ambiguous for 0 and unambiguous for both + and −. As will be shown in a selected embodiment of the invention, these table values are reciprocal and unambiguous when processed in accordance with this invention.

Other ambiguities resulting from one-half interval offset arithmetic addition of signed binary sequences are illustrated in FIG. 3. The values in sequence C are missing in positions 1 and 17 of the example which is based on selected characters of the seven-unit ASCII code with even parity. Were sequences A and B based on 16 element binary, sequence C values 1 and 33 would be missing and hence ambiguous. This same reasoning extends to the arithmetic addition of binary sequences of any practicable length from which the first and last elements of the resulting three-valued sequence will always be ambiguous. As will be shown in a selected embodiment of the invention, these ambiguities are resolved when processed in accordance with this invention.

A major dual binary three-level encode and decode ambiguity is illustrated in FIG. 4. As can be seen in both elements of this figure, ambiguity extends to every element of the three-valued sequences in that whether 0's or 1's are in sequences A and B or vice versa, identical and hence totally ambiguous three-valued sequences result. As will be shown in a selected embodiment of the invention, this ambiguity is resolved when processed in accordance with this invention.

A block schematic shown in FIG. 5 illustrates the encode features of the invention. Register A may be loaded either serially or in parallel; in this the case the bit pattern representing the ASCII character "2" with even parity is shown. Also, Register B may be loaded either serially or in parallel; in this case the bit pattern representing the ASCII character "V" with even parity is shown. As is well known in the art, these registers may be loaded from associated registers, buffers, paper or magnetic tape recording systems, communication systems, or the like. The bit pattern in A and B is shown both in binary and in signed binary values. Arithmetic addition, or combination of the contents of binary registers A and B is performed in accordance with the relations of FIG. 2. Register B is offset one-half signed binary element toward the right, or the least significant element of register A and the addition of all one-half signed binary elements in both registers is performed simultaneously or in parallel to produce the three-valued code elements shown in register C. Register C may be read out serially or in parallel as may be required for an application. This offset addition causes an encode ambiguity for register C elements 1 and 17 which is resolved through this invention by carry-around addition or combination of B8 and A1 to produce C–1, and between B8 and B8 to produce the LINK register element C–17. C–17 will always contain either a + or a − value. Though ambiguous in a decode sense, the 0 elements of three-valued coding are valid for this encode function.

Nonredundant error detection is inherent in certain three-valued codes in that unlike values (+ and −) are always separated by an odd number of 0's. Like values (+ and + or − and −) are always separated by an even number of 0's. In the case of successive +'s or successive −'s, they are defined as being separated by zero 0's, an even number fitting the above rule.

Study of FIG. 5, Register C contents for all permutations of code elements in Registers A and B, the carry-around addition element C–1 and the LINK element C–17 included, reveals that the error detection feature which is inherent in other three-valued codes cited above is also inherent in the dual binary three-valued code. This is true for either even or odd parity in Registers A and B and includes the case for all 0's in Register A, all 1's in Register B, and vice versa. This is demonstrated in FIG. 6 where an even number of 0's may be counted to left or right of the LINK signed value. Further, parity checking in Registers A and B may be discarded in favor of eight binary information bits and still retain the inherent error detection feature in the Register C resultant three-valued code, its carry-around element C–1 and its LINK element C–17 included. Thus, the invention has not disturbed the inherent error detection feature of the three-valued code.

The dual binary three-valued code nonredundant error detection feature extends to code sequences of any practicable number of bits or elements in Registers A and B, i.e., 12, 18, 24 bits or more, with a corresponding number of bits in Register C, i.e., 25, 37, 49, or more. Thus, three-valued code block length register error checking appears feasible without using redundant parity bits. Applications involving continuous or serial processing will be treated separately.

The total ambiguity of the three-valued code resulting from all 0's and all 1's appearing in Registers A and B and vice versa is resolved through this invention of carry-around and LINK values in the three-valued code. This is clearly demonstrated in FIG. 6 where a + value in the LINK C–17 reflects all +'s in Register B, and where a – value in the LINK C–17 reflects all –'s in Register B, thus reflecting the correct values for Reg. A as well.

A block schematic which illustrates the decode features of the invention is shown in FIG. 7. Decode functions begin either by serial or by parallel loading of Register C. Decode starts by transfer of the Reg. C–17 value sign to Reg. B8. From this point, the values are propagated back through the registers with relations being established in accordance with the flow pattern shown in FIG. 7 and using the table values of FIG. 2. The FLAG generated by relation of A1 and C–1 is an end of cycle control function.

From the above, it is clear that the information and the invention required for unambiguous decode of a three-valued code 0 is realized through addition of the LINK to the C register sequence. Similarly, the LINK invention for the C register provides information for resolution of the decode ambiguity in three-valued code sequences containing all 0 information bits. This unambiguous decode is demonstrated in FIG. 8 where it can be seen that the sign of the LINK value determines which binary register has all 1's and which has all 0's.

Thus correct bit values may be decoded and allocated to Registers A and B which, upon appearance of the FLAG control function (either + or –) as illustrated in FIGS. 7 and 8, may be read out either serially or in parallel into associated registers, buffers, paper tape or magnetic tape storage systems or into communication systems.

The Register C LINK element has other uses such as: A character or block framing element useful in synchronous or asynchronous operation of dual-channel three-level signaling systems using various modulation techniques. Further, if coding is used within the Register C LINK element, added modes of control in communication, data storage and recovery, and in computer memory systems appear feasible.

Referring now to FIG. 9, this figure shows a selected embodiment of encode system circuitry for a dual binary three-valued code. For reference convenience, the contents of FIGS. 2 and 5 are repeated as a part of FIG. 9. Contact closures for Register A, A1 through A8 are in accordance with binary pattern 01001101, A8 being a binary 1 based on even parity. Likewise, contact closures for Register B, B1 through B8, are in accordance with binary pattern 01101010, B8 being a binary 0 based on even parity. In both registers, the signed binary equivalents are shown which correspond to the balanced polarized outputs of the power supply which are referenced to ground.

Continuing discussion of FIG. 9, closure of Reg. A1 contact 11 delivers a negative polarity to junction 12 and across resistor 13 to Reg. C–1 terminal 14 which assumes the negative polarity referred to ground as shown. Further, closure of Reg. B8 contact 15 delivers a negative polarity to junction 16 and thence across resistor 17 to Reg. C–1 terminal 14 which assumes a negative polarity with respect to ground as shown. Having received negative polarities from both sources 13 and 17, Reg. C–1 is established as having a (–) value of a three-valued code in accordance with the Table of Relations. This completes the carry-around arithmetic addition between A1 and B8 thus resolving the C–1 ambiguity which has been described in discussion of the invention above. Returning to junction 16, a negative polarity from Reg. B8 contact 15 carries to junction 18 and thence across resistor 19 to terminal 20 which assumes a negative polarity with respect to ground as shown. This establishes LINK Reg. C–17 as having a (–) value in the three-valued code and resolves the encode ambiguity for element C–17. Since LINK Reg. C–17 values are always the same as Reg. B8 signed values, the three-valued code element (0) will never appear in the LINK register.

Returning to A1, junction 12, a negative polarity defined earlier is carried across resistor 21 to Reg. C–2 terminal 22. Further, closure of Reg. B1 contact 23 delivers a negative polarity to junction 24 and thence across resistor 25 to Reg. C–2 terminal 22. Having received negative polarities from both sources 21 and 25, Reg. C–2 is established as having a (–) value in a three-valued code which is in accordance with the Table of Relations.

Returning to Reg. B1, junction 24, a negative polarity defined earlier is carried across resistor 26 to Reg. C–3 terminal 27. Reg. A2 contact closure 28 delivers a positive polarity to junction 29 and thence across resistor 30 to Reg. C–3 terminal 27. Thus, balanced positive and negative polarities from sources 26 and 30 produce a resultant zero voltage at terminal 27 with reference to ground and establish a (0) value in the three-valued code at Reg. C–3 as is shown which is in accordance with the Table of Relations.

Returning to Reg. A2 junction 29, a positive polarity defined earlier is carried across resistor 31 to Reg. C–4 terminal 32. Reg. B2 contact closure 33 delivers a positive polarity to junction 34 and thence across resistor 35 to Reg. C–4 terminal 32 which assumes a positive polarity with reference to ground. Having received positive polarities from both sources 31 and 35, Reg. C–4 is established as having a (+) value in a three-valued code as shown which is in accordance with the Table of Relations.

Returning to Reg. B2 junction 34, a positive polarity defined earlier is carried across resistor 36 to Reg. C–5 terminal 37. Reg. A3 contact closure 38 delivers a negative polarity to junction 39 and thence across resistor 40 to Reg. C–5 terminal 37. Thus, balanced positive and negative polarities from sources 36 and 40 produce a resultant zero voltage at terminal 37 with reference to ground and establish a (0) value in the three-valued code at Reg. C–5 as is shown which is in accordance with the Table of Relations.

Returning to Reg. A3 junction 39, a negative polarity defined earlier is carried across resistor 41 to Reg. C–6 terminal 42. Reg. B3 contact closure 43 delivers a positive polarity to junction 44 and thence across resistor 45 to Reg. C–6 terminal 42. Thus, balanced positive and negative polarities received from sources 45 and 41 produce a resultant zero voltage at terminal 42 with reference to ground and establish Reg. C–6 as a (0) value in the three-valued code which is in accordance with the Table of Relations.

Returning to Reg. B3 junction 44, a positive polarity defined earlier is carried across resistor 46 to Reg. C–7 terminal 47. Reg. A4 contact closure 48 delivers a negative polarity to junction 49 and thence across resistor 50 to Reg. C–7 terminal 47. Thus, balanced positive and negative polarities from sources 46 and 50 produce a resultant zero voltage at terminal 47 with reference to ground and establish a (0) value in the three-valued code at Reg. C–7 as is shown which is in accordance with the Table of Relations.

Returning to Reg. A4 junction 49, a negative polarity defined earlier is carried across resistor 51 to Reg. C–8 terminal 52. Reg. B4 contact closure 53 delivers a negative polarity to junction 54 and thence across resistor 55 to Reg. C–8 terminal 52. Having received negative polarities from both sources 51 and 55, Reg. C–8 is established as having a (−) value in a three-valued code as is shown which is in accordance with the Table of Relations.

Returning to Reg. B4 junction 54, a negative polarity defined earlier is carried across resistor 56 to Reg. C–9 terminal 57. Reg. A5 contact closure 58 delivers a positive polarity to junction 59 and thence across resistor 60 to Reg. C–9 terminal 57. Thus, balanced positive and negative polarities from sources 60 and 56 produce a resultant zero voltage at terminal 57 with reference to ground and establish a (0) value in the three-valued code at Reg. C–9 as is shown which is in accordance with the Table of Relations.

Returning to Reg. A5 junction 59, a positive polarity defined earlier is carried across resistor 61 to Reg. C–10 terminal 62. Reg. B5 contact closure 63 delivers a positive polarity to junction 64 and thence across resistor 65 to Reg. C–10 terminal 62. Having received positive polarities with reference to ground from both sources 61 and 65, Reg. C–10 is established as having a (+) value in a three-valued code as is shown which is in accordance with the Table of Relations.

Returning to Reg. B5 junction 64, a positive polarity defined earlier is carried across resistor 66 to Reg. C–11 terminal 67. Reg. A6 contact closure 68 delivers a positive polarity to junction 69 and thence across resistor 70 to Reg. C–11 terminal 67. Having received positive polarities with reference to ground from both sources 66 and 70, Reg. C–11 is established as having a (+) value in a three-valued code as is shown which is in accordance with the Table of Relations.

Returning to Reg. A6 junction 69, a positive polarity defined earlier is carried across resistor 71 to Reg. C–12 terminal 72. Reg. B6 contact closure 73 delivers a negative polarity to junction 74 and thence across resistor 75 to Reg. C–12 terminal 72. Thus, balanced positive and negative polarities from sources 71 and 75 produce a resultant zero voltage at terminal 72 with reference to ground and establish a (0) value in the three-valued code at Reg. C–12 as is shown which is in accordance with the Table of Relations.

Returning to Reg. B6 junction 74, a negative polarity defined earlier is carried across resistor 76 to Reg. C–13 terminal 77. Reg. A7 contact closure 78 delivers a negative polarity to junction 79 and thence across resistor 80 to Reg. C–13 terminal 77. Having received negative polarities with reference to ground from both sources 76 and 80, Reg. C–13 is established as having a (−) value in a three-valued code as is shown which is in accordance with the Table of Relations.

Returning to Reg. A7 junction 79, a negative polarity defined earlier is carried across resistor 81 to Reg. C–14 terminal 82. Reg. B7 contact closure 83 delivers a positive polarity to junction 84 and thence across resistor 85 to Reg. C–14 terminal 82. Thus, balanced positive and negative polarities from sources 85 and 81 produce a resultant zero voltage at terminal 82 with reference to ground and establish a (0) value in the three-valued code at Reg. C–14 as is shown which is in accordance with the Table of Relations.

Returning to Reg. B7 junction 84, a positive polarity defined earlier is carried across resistor 86 to Reg. C–15 terminal 87. Reg. A8 contact closure 88 delivers a positive polarity to junction 89 and thence across resistor 90 to Reg. C–15 terminal 87. Having received positive polarities with reference to ground from both sources 86 and 90, Reg. C–15 is established as having a (+) value in a three-valued code as is shown which is in accordance with the Table of Relations.

Returning to Reg. A8 junction 89, a positive polarity defined earlier is carried across resistor 91 to Reg. C–16 terminal 92. Completing the circle and returning to Reg. B8 junctions 16 and 18, a negative polarity defined earlier carries across resistor 93 to Reg. C–16 terminal 92. Thus, balanced positive and negative polarities from sources 91 and 93 produce a resultant zero voltage at terminal 92 with reference to ground and establish a (0) value in the three-valued code at Reg. C–16 as is shown which is in accordance with the Table of Relations. This completes a step-by-step analysis of the encode process in this embodiment.

Figure 10:
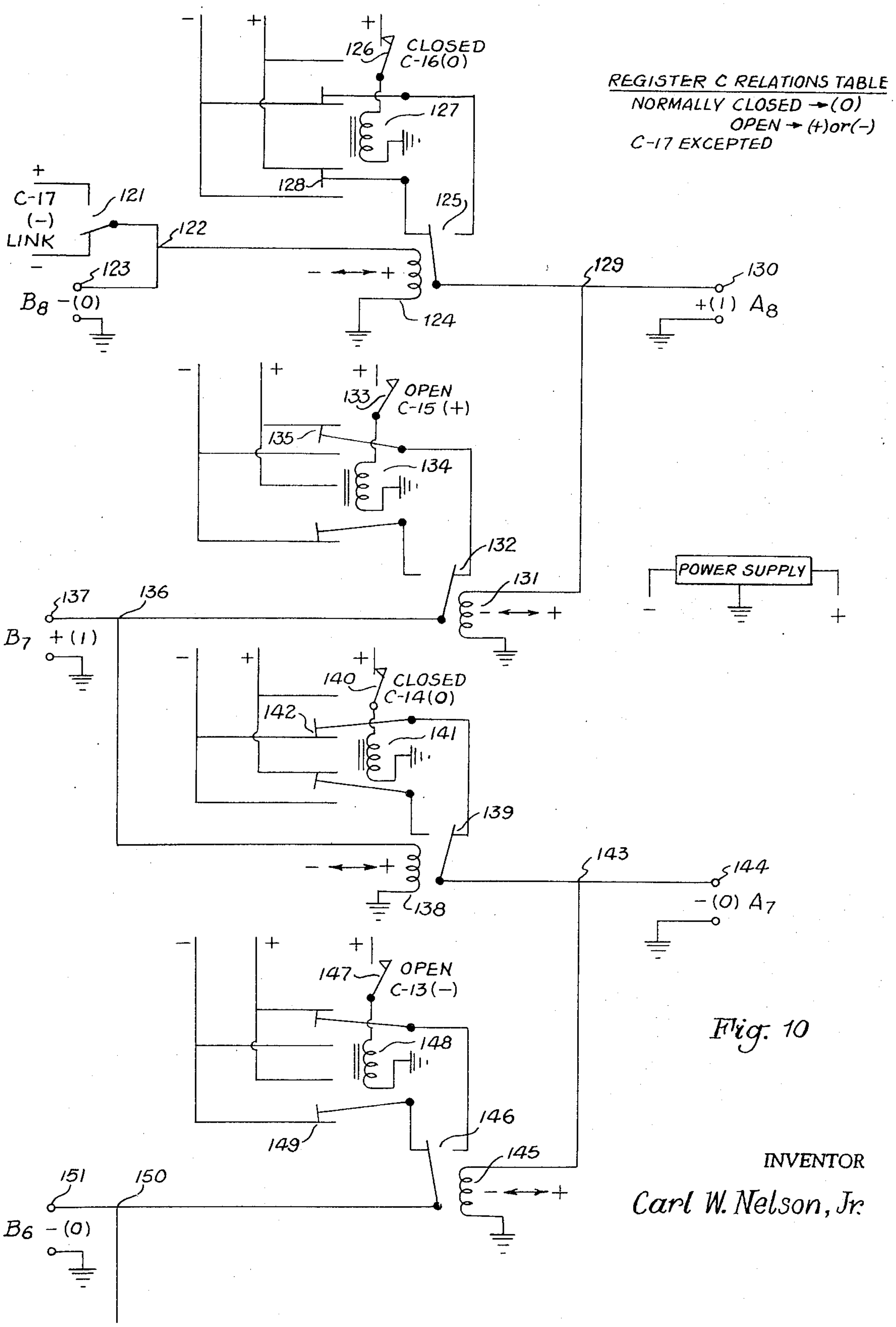
Figure 10A:
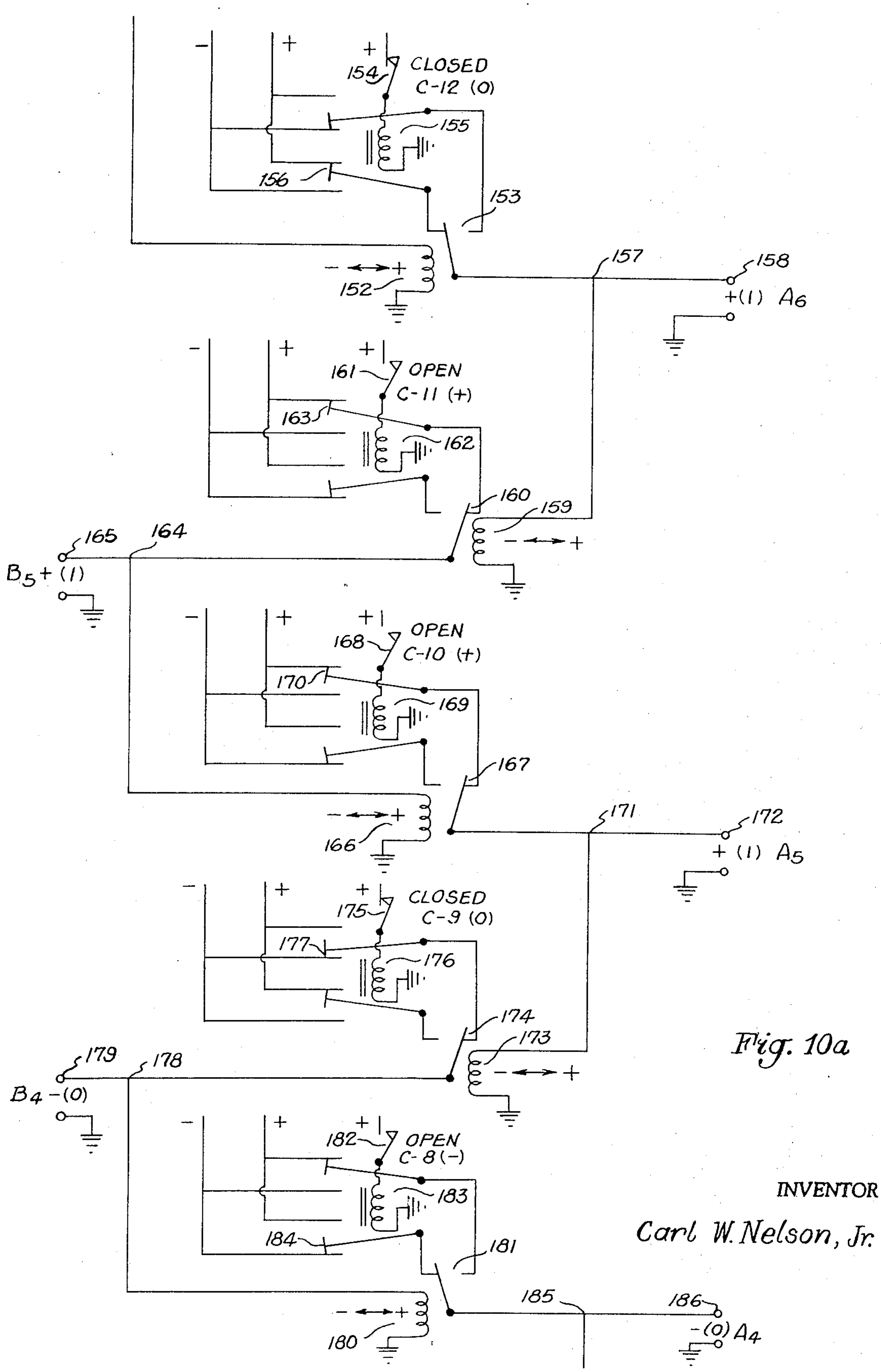
Figure 10B:
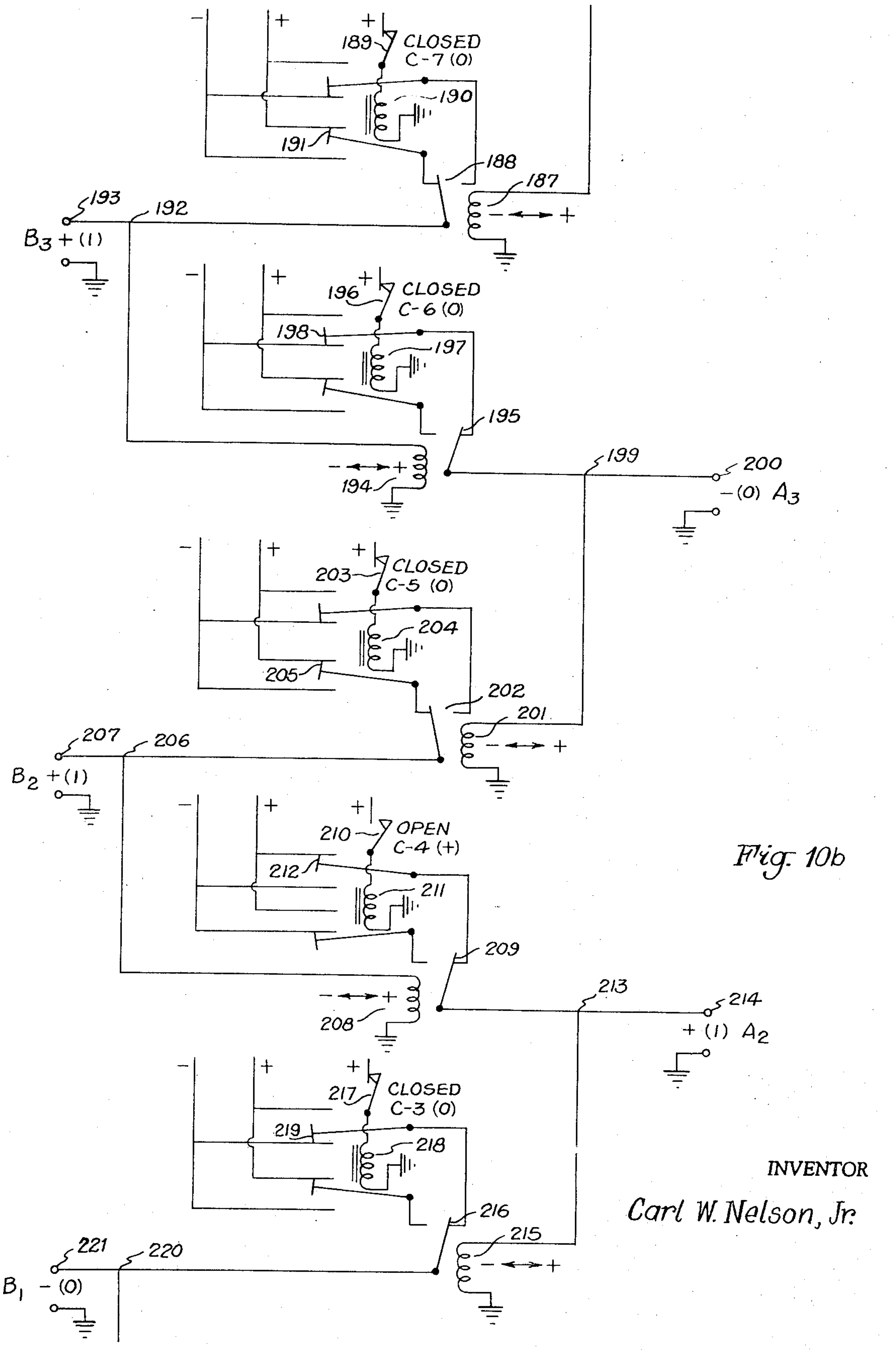

Referring now to FIG. 10, this figure shows a selected embodiment of decode system circuitry for a dual binary three-valued code. For reference convenience, the contents of FIGS. 2 and 7 are repeated as a part of FIG. 10. Also, this figure contains a Register C contact closure relations table. In analysis of the circuit operation, the following should be considered: Contact positions for Reg. C, C–1 through C–17 are set representative of a register parallel loading not shown but in accordance with the three-valued code sequence − − 0 + 0 0 0 − 0+ + 0 − 0 + 0 −. This is the same Reg. C three-valued code sequence formed by the FIG. 9 circuitry encode operation. The power supply for the system has a balanced polar output with reference to the system ground as is shown. With exception of the LINK Reg. C–17 contact which is polarized, note that Reg. C input contacts have two positions which are defined in the Register C Relations Table of FIG. 10. For (0) three-valued functions, the input contact is normally closed and the Reg. C unpolarized relay is operated; and, for (+) and (−) three-valued functions, the input contact is open and the Reg. C unpolarized relay is not operated. The movement of all polarized relay contacts is consistent as shown in that a positive polarity with respect to system ground drives the relay contact to the right position as shown; and, a negative polarity with respect to system ground drives the relay contact to the left position as is shown. All signed binary to binary relations are in accordance with FIG. 1.

Continuing discussion of FIG. 10, LINK Reg. C–17 contact position 121 delivers a negative polarity to junction 122 which is carried on to Reg. B8 terminal 123 with reference to system ground, thus loading a signed binary − or binary (0) in Reg. B8. Returning to junction 122, the negative polarity is carried to polar relay winding 124 resulting in its contact closure to the left as shown for contact 125. For a Reg. C–16 (0), contact 126 is closed operating unpolarized relay 127, contact 128 of which carries a positive polarity via contact 125 to junction 129 and on to Reg. A8 terminal 130 with reference to ground, thus loading a signed binary + or a binary (1) in Reg. A8.

Returning to junction 129, a positive polarity is carried to polar relay winding 131 resulting in its contact closure to the right as is shown for contact 132. For a Reg. C–15 (+), contact 133 is open leaving unpolarized relay 134 not operated, contact 135 of which carries a positive polarity via contact 132 to junction 136 and on to Reg. B7 terminal 137 with reference to ground, thus loading a signed binary + or binary (1) in Reg. B7.

Returning to junction 136, a positive polarity is carried to polar relay winding 138 resulting in its contact closure to the right as is shown for contact 139. For a Reg. C–14 (0), contact 140 is closed operating unpolarized relay 141, contact 142 of which carries a negative polarity via contact 139 to junction 143 and on to Reg. A7 terminal 144 with reference to ground, thus loading a signed binary—or binary (0) in Reg. A7.

Returning to junction 143, a negative polarity is carried to polar relay winding 145 resulting in its contact closure to the left as is shown for contact 146. For a Reg. C–13 (−), contact 147 is open leaving unpolarized relay 148 not operated, contact 149 of which carries a negative polarity via contact 146 to junction 150 and on to Reg. B6 terminal 151 with reference to ground, thus loading a signed binary − or binary (0) in Reg. B6.

Returning to junction 150, a negative polarity is carried to polar relay winding 152 resulting in its contact closure to the left as is shown for contact 153. For a Reg. C–12 (0), contact 154 is closed operating unpolarized relay 155, contact 156 of which carries a positive polarity via contact 153 to junction 157 and on to Reg. A6 terminal 158 with reference to ground, thus loading a signed binary + or binary (1) in Reg. A6.

Returning to junction 157, a positive polarity is carried to polar relay winding 159 resulting in its contact closure to the right as is shown for contact 160. For a Reg. C–11 (+), contact 161 is open leaving unpolarized relay 162 not operated, contact 163 of which carried a positive polarity via contact 160 to junction 164 and on to Reg. B5 terminal 165 with reference to ground, thus loading a signed binary + or binary (1) in Reg. B5.

Returning to junction 164, a positive polarity is carried to polar relay winding 166 resulting in its contact closure to the right as is shown for contact 167. For a Reg. C–10 (+) contact 168 is open leaving unpolarized relay 169 not operated, contact 170 of which carries a positive polarity via contact 167 to junction 171 and on to Reg. A5 terminal 172 with reference to ground, thus loading a signed binary + or binary (1) in Reg. A5.

Returning to junction 171, a positive polarity is carried to polar relay winding 173 resulting in its contact closure to the right as is shown for contact 174. For a Reg. C–9 (0), contact 175 is closed operating unpolarized relay 176, contact 177 of which carries a negative polarity via contact 174 to junction 178 and on to Reg. B4 terminal 179 with reference to ground, thus loading a signed binary − or binary (0) in Reg. B4.

Returning to junction 178, a negative polarity is carried to polar relay winding 180 resulting in its contact closure to the left as is shown for contact 181. For a Reg. C–8 (−), contact 182 is open leaving unpolarized relay 183 not operated, contact 184 of which carries a negative polarity via contact 181 to junction 185 and on to Reg. A4 terminal 186 with reference to ground, thus loading a signed binary − or binary (0) in Reg. A4.

Returning to junction 185, a negative polarity is carried to polar relay winding 187 resulting in its contact closure to the left as is shown for contact 188. For a Reg. C–7 (0), contact 189 is closed operating unpolarized relay 190, contact 191 of which carries a positive polarity via contact 188 to junction 192 and on to Reg. B3 terminal 193 with reference to ground, thus loading a signed binary + or binary (1) in Reg. B3.

Returning to junction 192, a positive polarity is carried to polar relay winding 194 resulting in its contact closure to the right as is shown for contact 195. For A Reg. C–6 (0), contact 196 is closed operating unpolarized relay 197, contact 198 of which carries a negative polarity via contact 195 to junction 199 and on to Reg. A3 terminal 200 with reference to ground, thus loading a signed binary − or binary (0) in Reg. A3.

Returning to junction 199, a negative polarity is carried to polar relay winding 201 resulting in its contact closure to the left as is shown for contact 202. For a Reg. C–5 (0), contact 203 is closed operating unpolarized relay 204, contact 205 of which carries a positive polarity via contact 202 to junction 206 and on to Reg. B2 terminal 207 with reference to ground, thus loading a signed binary + or binary (1) in Reg. B2.

Returning to junction 206, a positive polarity is carried to polar relay winding 208 resulting in its contact closure to the right as is shown for contact 209. For a Reg. C–4 (+), contact 210 is open leaving unpolarized relay 211 not operated, contact 212 of which carries a positive polarity via contact 209 to junction 213 and on to Reg. A2 terminal 214 with reference to ground, thus loading a signed binary + or binary (1) in Reg. A2.

Returning to junction 213, a positive polarity is carried to polar relay winding 215 resulting in its contact closure to the right as is shown for contact 216. For a Reg. C–3 (0), contact 217 is closed operating unpolarized relay 218, contact 219 of which carries a negative polarity via contact 216 to junction 220 and on to Reg. B1 terminal 221 with reference to ground, thus loading a signed binary − or binary (0) in Reg. B1.

Returning to junction 220, a negative polarity is carried to polar relay winding 222 resulting in its contact closure to the left as is shown for contact 223. For a Reg. C–2 (−), contact 224 is open leaving unpolarized relay 225 not operated, contact 226 of which carries a negative polarity via contact 223 to junction 227 and on to Reg. A1 terminal 228 with reference to ground, thus loading a signed binary − or binary (0) in Reg. A1.

Returning to junction 227, a negative polarity is carried to polar relay winding 229 resulting in its contact closure to the left as is shown for contact 230. For a Reg. C–1 (−), contact 231 is open leaving unpolarized relay 232 not operated, contact 233 of which carries a negative polarity via contact 230 to FLAG terminal 234 with reference to ground. As described earlier, whether + or −, this FLAG signal is the control signal for readout if the binary sequences which have been unambiguously decoded from the three-valued code into the two binary registers A and B. This completes a step by step analysis of the decode process in this embodiment.

The circuitry described above is illustrative of but one embodiment making use of the principles of this invention. Many other applications may be devised by those skilled in the art without departing from the spirit and scope of this invention. For example the unambiguous dual binary three-valued coding principles involved permit at least doubling the capacity of information storage devices such as acoustic and other types of delay lines and registers capable of three-valued coding principles will become increasingly useful as computing systems and related circuitry are developed which are based on ternary number systems. Further, the coding principles of this invention permit unambiguous three-level modulation and signaling systems which can be very useful for high-rate unambiguous information transfer, i.e., maximum information transfer per unit bandwidth, using error detection which is nonredundant and inherent in dual binary three-valued coding, the LINK value included. Finally, the LINK code element is useful in signal modulation and demodulation as a synchronizing pulse either in synchronous or in asynchronous systems, control of which may be further enhanced by coding within the LINK element.

What is claimed is:

1. In a dual binary three-valued coding system, apparatus for encoding of the type in which signed binary sequence input values + or − in binary sequence elements A1 to A*n*, each element being subdivided into two one-half code elements having the sign +, + or −, − of its corresponding input value, are combined in parallel with the values from similar sequence elements from binary sequence B1 to B*n* in which the binary sequence values B1 to B*n* + or − are subdivided into two one-half code elements +, + or −, −, said B1 to B*n* sequence elements being offset from the A1 to A*n* sequence elements by a one-half code element, a sequence of three-valued sequence elements C1 to C(2*n*+1), a connection from each one-half binary sequence element from A1 to A*n* connecting each one-half code element in sequence to three-valued sequence elements C1 to C2*n*, and a connection from each one-half binary sequence element B1 to B*n* connected in sequence to three-valued sequence elements C2 to C(2*n*+1) to give three-valued code values +, 0 or − in each said three-valued sequence element C1 through C(2n+1); the improvement comprising means connecting sequence element B*n* to the first three-valued sequence element C1, for giving said first three-valued code element C1 a value +, 0 or − according to the sign of the signed binary values of A1 and B*n*; said last one-half binary sequence element B*n* being also operatively connected by a link to said C(2n+1) three-valued sequence element to give the same signed value + or − to the sequence element C(2n+1) as is carried by binary sequence element B*n*.

2. The dual binary three-valued coding system of claim 1, in which in the apparatus for encoding, the connection of each one-half code elements from code sequence A1–A*n* and from code sequence B1–B*n* to three-valued code sequence C1 to C2*n* each comprise a resistor element, the last one-half binary sequence resistor element B*n* being connected to the first three-valued code element C1, whereby, all said resistors are connected in series in a ring circuit, the operative connecting link from said last one-half binary sequence element B*n* that is connected to said C(2*n*+1) three-valued sequence code element also consisting of a resistance.

3. In a dual binary three-valued coding system according to claim 1, further comprising apparatus for unambiguous decoding of the three level coded sequence, C1–C(2*n*+1), into its component signed binary coded sequences A1–A*n* and B1–B*n*, said apparatus including relay means interconnected as follows:

| | | |
|---|---|---|
| | C2n±1 | Bn |
| Bn | C2n | An |
| An | C2n−1 | Bn−1 |
| Bn−1 | C2n−2 | An−1 |
| An−1 | C2n−3 | Bn−2 |
| Bn−2 | C2n−4 | An−2 |
| An−2 | C2n−5 | Bn−3 |
| Bn−3 | C2n−6 | An−3 |
| . | . | . |
| | | . |
| Bn−(n−1) | C2n−(2n−2) | An−(n−1) |
| An−(n−1) | C2n−(2n−1) | Flag |

for decoding, said three-valued code sequence.

4. The information decoding system of claim 3, said relay means including a single-pole polar and single-pole and double-pole unpolarized relays and for each C1 to C2n+1 value and a single-pole polar relay for the C2n+1 value and having associated contact means arranged for decoding of said dual binary unambiguous three-valued codes; said relays being arranged in the following sequence, the single-pole polar relay C2n+1 delivering a selected polarity corresponding to the code value C2n+1 to terminal Bn, to set the decode signed value for Bn and setting the same signed value at polar relay C2n, the unpolarized relay means positioned in the three-valued code value for C2n passing a polarity via double-pole double-throw contacts and via polar relay C2n contacts previously positioned by the polarity corresponding to code value C2n+1 to output terminal An, thus setting its signed binary value; and then delivering the polarity of An to polar relay C2n−1, positioning its contacts; unpolarized relays C2n−1 being operated in accordance with a value for C2n−1, its double-pole double-throw contact delivering that polarity via a contact of polar relay C2n−1 to terminal Bn−1, thus setting its signed binary value; the balance of decode relay operation repeating in sequence of the same order to completion of the decode operation in the same order ending with the sequence: Bn−(n−1), C2n−(2n−2), An−(n−1), C2n−(2n−1) and FLAG, FLAG being the readout control signal to registers associated with output sequence An and Bn.

* * * * *

UNITED STATES PATENT OFFICE
CERTIFICATE OF CORRECTION

Patent No. 3,641,327 Dated February 8, 1972

Inventor(s) Carl W. Nelson, Jr.

It is certified that error appears in the above-identified patent and that said Letters Patent are hereby corrected as shown below:

On the cover sheet, in the ABSTRACT, the last two lines should read -- a FLAG signal element useful in clocking the signed binary outputs into their related circuit registers. --

Signed and sealed this 7th day of November 1972.

(SEAL)
Attest:

EDWARD M.FLETCHER,JR.
Attesting Officer

ROBERT GOTTSCHALK
Commissioner of Patents